United States Patent [19]

McDermott et al.

[11] Patent Number: 5,860,105
[45] Date of Patent: Jan. 12, 1999

[54] NDIRTY CACHE LINE LOOKAHEAD

[75] Inventors: Mark W. McDermott; Robert W. French, both of Austin, Tex.; Antone L. Fourcroy, Ft. Collins, Colo.; Mark E. Burchfield, Austin; Xiaoli Y. Mendyke, Plano, both of Tex.

[73] Assignee: National Semiconductor Corporation, Santa Clara, Calif.

[21] Appl. No.: 557,977

[22] Filed: Nov. 13, 1995

[51] Int. Cl.$^6$ .................................................. G06F 12/00
[52] U.S. Cl. ........................ 711/135; 711/100; 711/113; 711/137; 711/141; 711/144
[58] Field of Search .................................... 395/468, 445, 395/473, 470, 464, 379, 479; 711/135, 141, 118, 146, 143, 137, 152

[56] References Cited

U.S. PATENT DOCUMENTS

| | | | |
|---|---|---|---|
| 5,325,503 | 6/1994 | Stevens et al. | 395/473 |
| 5,471,602 | 11/1995 | DeLano | 395/445 |
| 5,524,234 | 6/1996 | Martinez, Jr. et al. | 395/468 |
| 5,537,573 | 7/1996 | Ware et al. | 395/464 |
| 5,551,000 | 8/1996 | Tan et al. | 395/445 |
| 5,555,379 | 9/1996 | Silla | 395/379 |
| 5,555,398 | 9/1996 | Raman | 395/470 |
| 5,557,769 | 9/1996 | Bailey et al. | 395/473 |
| 5,623,635 | 4/1997 | Chen et al. | 395/479 |

*Primary Examiner*—Tod R. Swann
*Assistant Examiner*—Fred. F. Tzeng
*Attorney, Agent, or Firm*—Andrew S. Viger

[57] ABSTRACT

An NDIRTY cache line lookahead technique is used to expedite cache flush and export operations by providing a mechanism to avoid scanning at least some cache lines that do not contain dirty data (and therefore will not have to be exported). The exemplary cache organization uses one-line lookahead where each cache line but the last has associated with it an NDIRTY bit that indicates whether the next cache line contains dirty data. For cache flush and export operations, when a cache line (N) is read to check for dirty data that must be exported, the NDIRTY bit for that cache line is also tested to determine whether the next cache line (N+1) contains dirty data—if the NDIRTY bit is clear, indicating that the next cache line is clean, then that line is skipped and the scan proceeds with the line after that (N+2). This exemplary one-line lookahead implementation is readily extendible to N-line lookahead. The cache line lookahead technique reduces the number of cache line accesses required during flush/export operations, with the attendant advantages of reduced flush/export penalty cycles and power, thereby improving overall system performance.

23 Claims, 7 Drawing Sheets

NDIRTY CACHE LINE LOOKAHEAD

BACKGROUND

1. Technical Field

The invention relates generally to computer systems, and more particularly relates to cache memory systems. In even greater particularity, the invention relates to cache flush mechanisms.

In an exemplary embodiment, the invention is used in connection with the internal L1 (level 1) cache on an x86 processor.

2. Related Art

Processors (such as microprocessors) commonly include an internal L1 (level one) cache. The L1 cache is typically operated in either of two modes: write-through or write-back (copy-back).

In write-through mode, each write to a cache line also results in an external bus cycle to write the corresponding data through to system DRAM—as a result, the cache and system DRAM always have the same data (are always coherent). In write-back mode, to reduce external bus traffic, writes to the cache are not automatically written-back to system DRAM, but rather, external write-back cycles are run to update system DRAM only if a cache line containing "dirty" data is replaced, invalidated, or exported (without invalidation) in response to a cache inquiry—in particular, a cache coherency protocol including cache inquiry cycles is required to ensure memory coherency during DMA (direct memory access) operations in which an external device (such as a disk drive) may directly access system DRAM (including locations that are also in the L1 cache).

In addition, under certain conditions, the entire L1 cache is invalidated or exported. If the cache is operated in write-back mode, then cache invalidation is implemented as a "flush" (export-then-invalidate)—each line of the cache is scanned for dirty data, and any dirty data is written-back prior to invalidating that cache line.

Without limiting the scope of the invention, this background information is provided in the context of a specific problem to which the invention has application: reducing the time required to export or flush the entire internal L1 cache of a processor. More generally, the problem is to reduce the time to export or flush any cache, internal or external, operating in write-back mode.

A common goal of processor design is to increase cache size. As caches become larger, the time to flush/export the entire cache increases. Typically, merely scanning the cache and checking dirty bits to identify cache lines (or data) that must be exported requires one clock cycle per line (the number of additional clocks required to complete the flush depends on the number of dirty lines and whether only the dirty data in a cache line or the entire cache line is exported).

Thus, for an 8K cache organized into 4 sets of 128 lines per set, over 500 clocks will be required to complete an export flush, while for a 16K cache organized into 4 sets of 256 lines per set for a total of 1024 cache lines, this flush/export penalty jumps to over a thousand clocks.

In the typical case, most of the data in a cache will be coherent with system DRAM, so that only a subset of the cache actually needs to be exported. However, for current cache designs, each flush/export operation still requires a full scan of the cache.

SUMMARY

An object of the invention is to store information in a cache array to reduce the time required for cache export and flush (export then invalidate) operations.

This and other objects of the invention are achieved by a cache architecture including cache line lookahead.

In one aspect of the invention, the cache is organized into cache lines with one or more dwords, where each cache line has associated with it at least one dirty bit indicating whether the cache line contains dirty data. The cache architecture includes an N-line lookahead array that includes, for each of at least M of the cache lines, N-line lookahead information that indicates whether any of the N successive cache lines contains dirty data.

In response to an export command, array sequencing logic controls the sequence for scanning cache lines to determine, for each cache line, whether it contains dirty data, such that, if it does, such dirty data is exported. When the array sequencing logic scans one of the M cache lines as determined by a current scan count, it contemporaneously accesses the N-line lookahead array to determine for such cache line whether any of the N successive cache lines contains dirty data. In response to accessing the N-line lookahead array, the array sequencing logic increments the current scan count to the next cache line containing dirty data, or if none of the next N successive cache lines contains dirty data, then the array sequencing logic increments the current scan count by N+1.

In another aspect of the invention, the cache architecture includes a valid bit for each cache line indicating whether the cache line is valid—the array sequencing logic is responsive to a flush command to scan cache lines, and for cache lines containing dirty data, export the dirty data prior to invalidating the cache line.

In an exemplary implementation, cache line lookahead is implemented as a one-line lookahead (N=1), such that, for each of the M cache lines, the N-line lookahead array includes an indication of whether the next successive cache line contains dirty data—the next line is skipped if it is clean.

Embodiments of the invention may be implemented to realize one or more of the following technical advantages. The NDIRTY cache-line lookahead technique is used during flush/export operations to avoid scanning at least a portion of the cache lines that do not contain dirty data (and therefore do not need to be exported). This technique reduces the number of cache line accesses required during flush/export operations, with the attendant advantages of reduced flush/export penalty cycles and power, thereby improving overall system performance and power dissipation. The exemplary implementation of the NDIRTY cache line lookahead technique with one NDIRTY bit per cache line is readily extendible to N-line lookahead. The NDIRTY cache line lookahead technique is applicable to internal and external caches of an arbitrary number of lines, sets, or divisions.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DRAWINGS

Figure 5A:
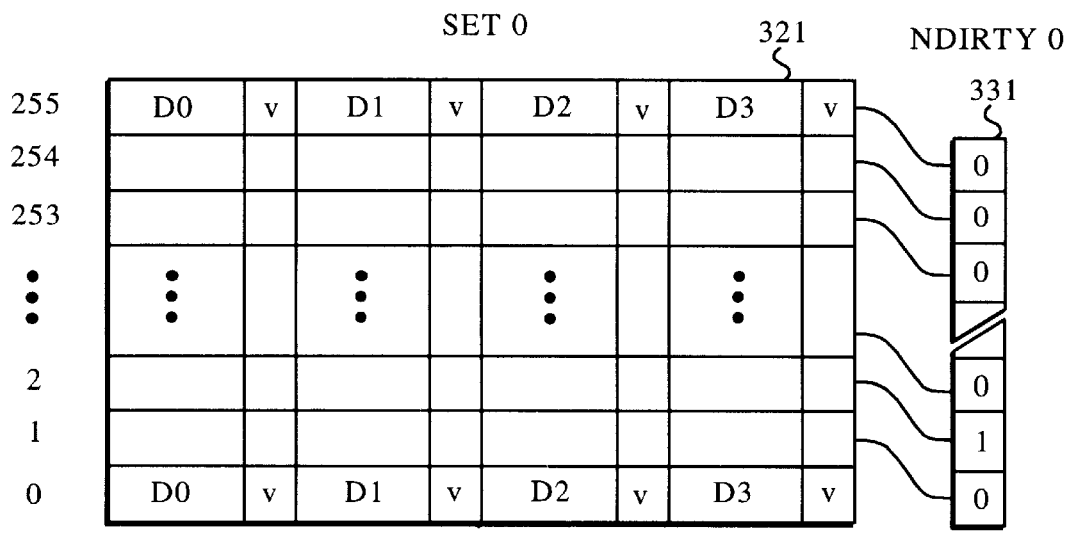

FIG. 5a further illustrates the exemplary implementation of the NDIRTY cache line lookahead technique for one-line lookahead.

Figure 5B:
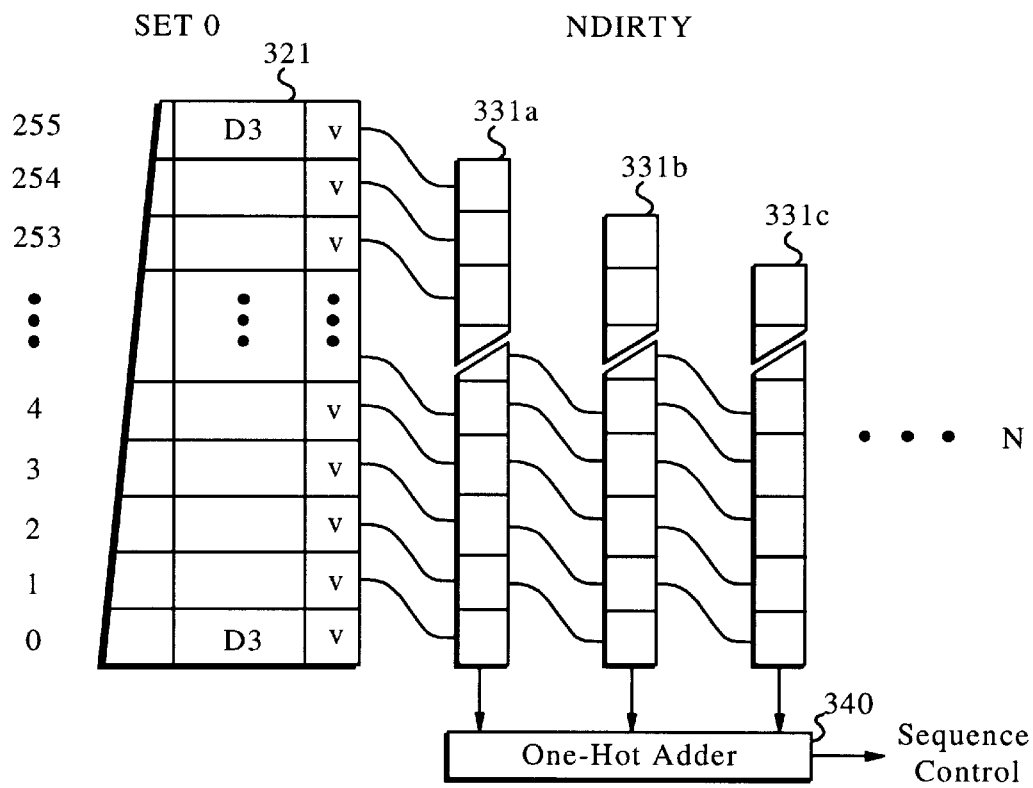

FIG. 5b illustrates the extension of the NDIRTY cache line lookahead technique to N-line lookahead.

DETAILED DESCRIPTION

The detailed description of an exemplary embodiment of the NDIRTY cache line lookahead technique is organized as follows:

1. Computer System
   1.1. System
   1.2. Processor
2. NDIRTY Cache Line Lookahead
   2.1. Cache Organization
   2.2. Flush/export Logic
      2.2.1. NDIRTY Array
      2.2.2. Flush/export Operation
   2.3. Extension To N-Line Lookahead
3. Conclusion This organizational outline, and the corresponding headings, are used in this Detailed Description for convenience of reference only.

The exemplary NDIRTY cache line lookahead technique is implemented in an exemplary x86 processor that includes an internal L1 16K unified code and data cache operable in either write-through or write-back mode. Detailed descriptions of conventional or known aspects of processor systems, including cache organization and control, are omitted so as to not obscure the description of the invention. In particular, terminology specific to the x86 microprocessor architecture (such as register names, signal nomenclature, addressing modes, coherency protocols, pinout definition, etc.) is known to practitioners in the microprocessor field, as is the basic design and operation of such microprocessors and of computer systems based on them.

When used with a signal, the # symbol designates a signal that is active low, while the / symbol designates the complement of a signal.

As used in this Detailed Description, "flush" refers to an export-then-invalidate operation, while "export" can refer either to an export-only operation or to the export operation for a flush.

1. Computer System

Figure 1:
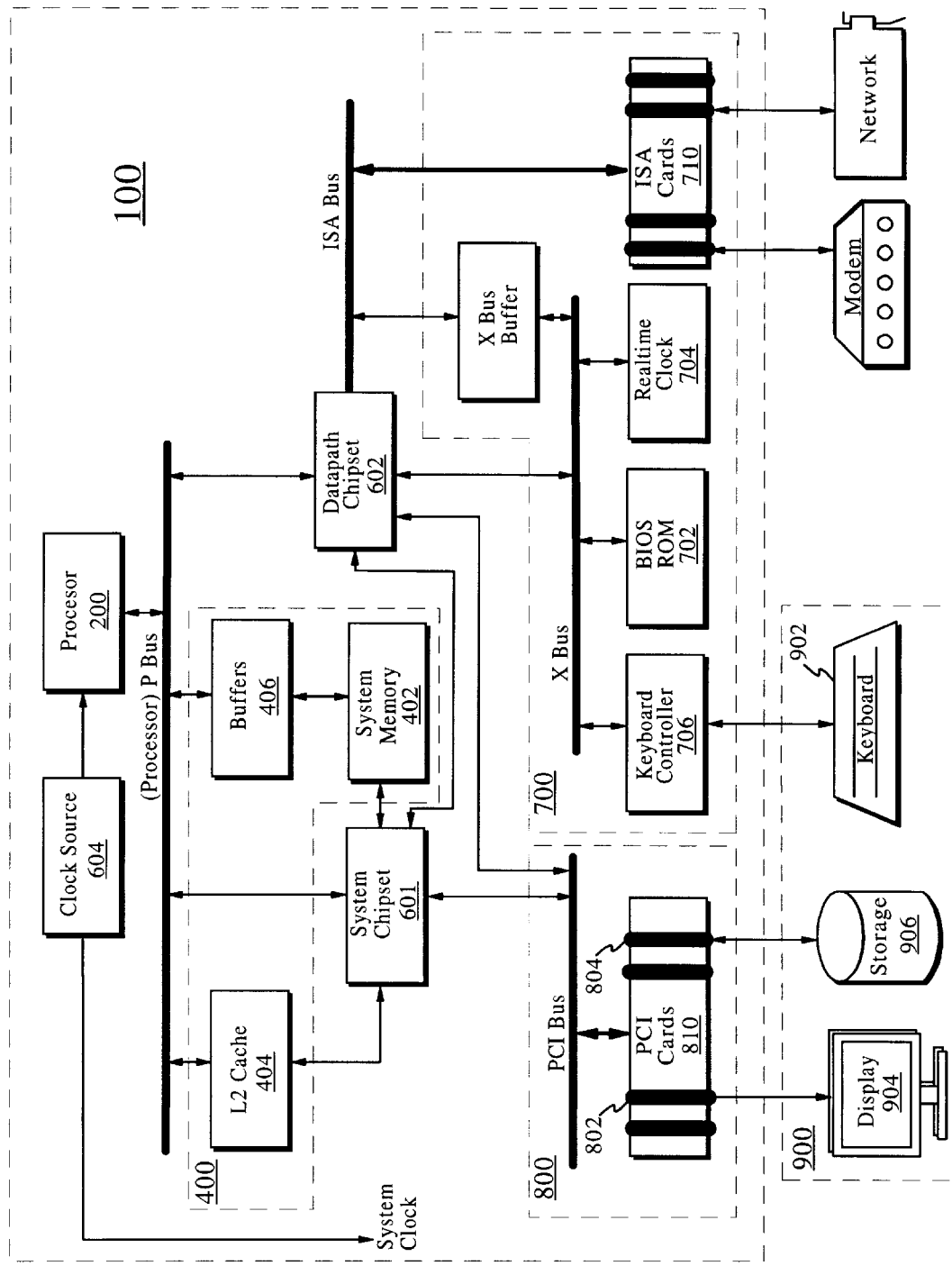
FIG. 1 illustrates an exemplary computer system including a motherboard with a Processor interfaced to the memory subsystem over a P-BUS.

FIG. 1 illustrates an exemplary computer system, including a system or motherboard 100 with a Processor 200, memory subsystem 400, and system logic including system chipset 601 and datapath chipset 602.

Figure 2A:
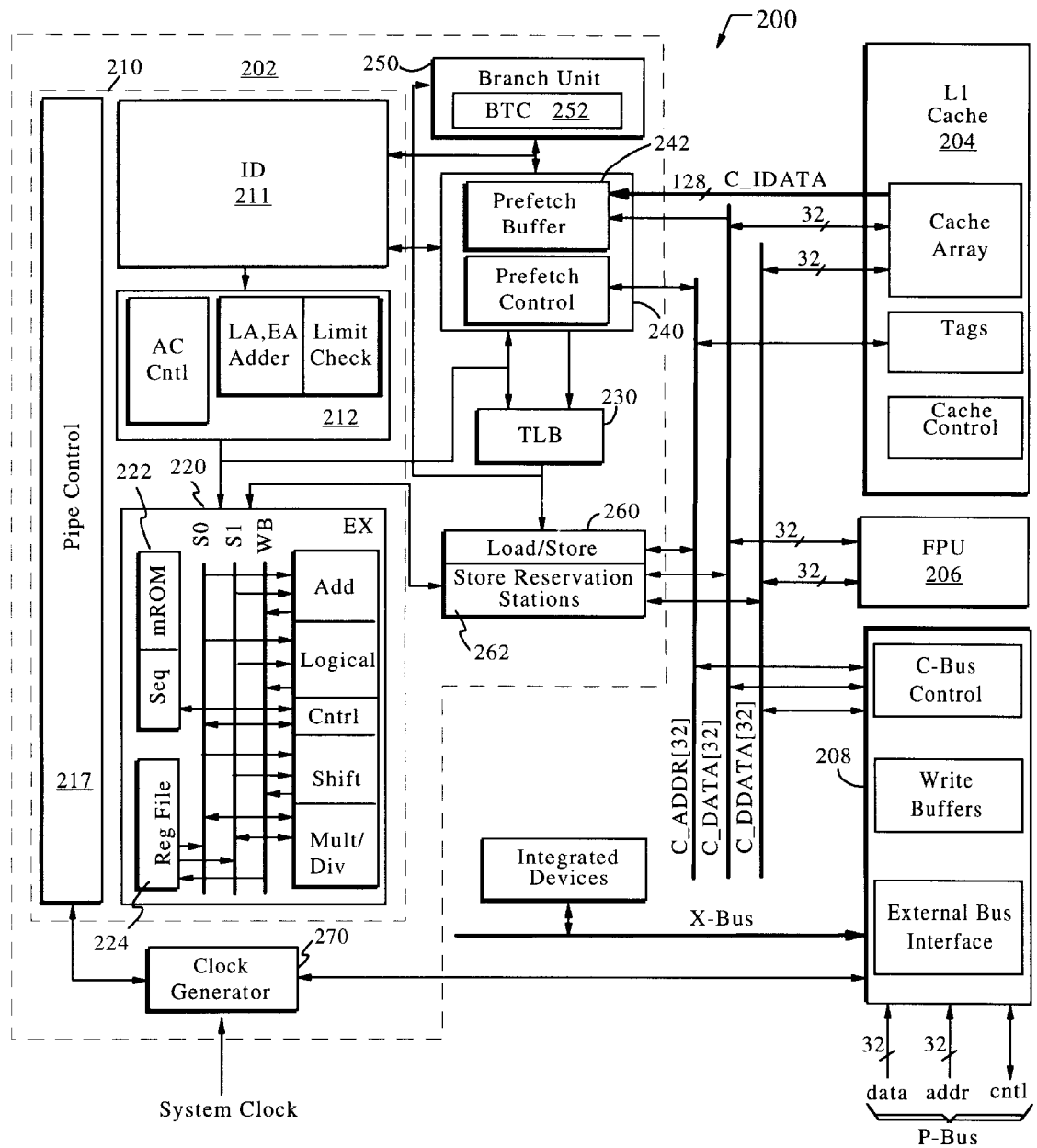
FIG. 2a illustrates an exemplary Processor including an internal L1 unified code and data cache.
Figure 2B:
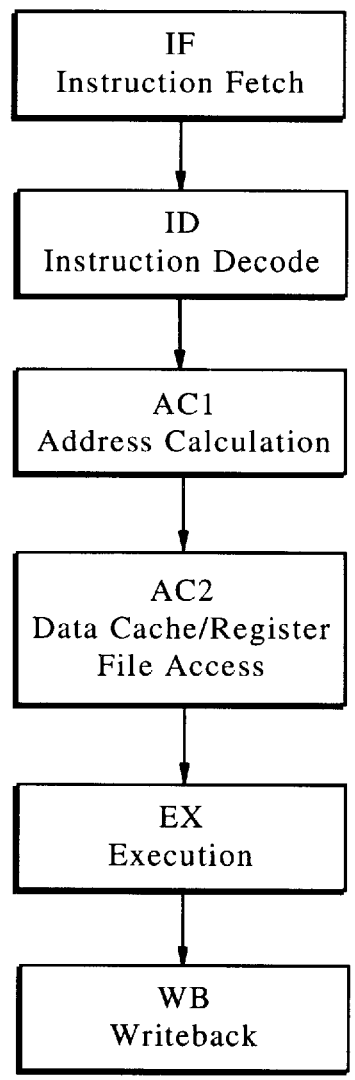
FIG. 2b illustrates the execution pipe stages for the exemplary processor.

FIGS. 2a and 2b illustrate the exemplary x86 Processor 200.

1.1. System

Referring to FIG. 1, motherboard 100 includes the Processor 200 interfaced to the memory subsystem 400 over a P-BUS (sometimes referred to as a CPU or local bus). The system logic includes, in addition to the system chipset 601 and datapath chipset 602, an external clock source 604 (which provides an external clock input to the Processor and system clock signals to the rest of the motherboard).

For the exemplary computer system, the P-BUS is a conventional 486-type 32-bit address and data bus.

For the exemplary computer system, the only system elements that reside on the P-Bus are the Processor 200, memory subsystem 400, and the system and datapath chipsets 601 and 602. According to the exemplary division of system logic functions, the system chipset interfaces to a conventional 32-bit PCI peripheral bus, while the datapath chipset interfaces to a 16-bit ISA peripheral bus and an internal 8-bit X bus.

Some current systems allow for a special VL-bus direct interface to the P-BUS for video/graphics and other peripherals.

For 32-bit systems with a 32 bit P-BUS, some current system logic designs combine the system and datapath chipset functions into a single chipset. For 64-bit systems with a 64-bit P-BUS, the pin count required by the 64-bit data bus width currently necessitates that the system and datapath chipset functions be split as indicated in FIG. 1.

Processor 200 is coupled over the P-BUS to system DRAM (memory) 402 and L2 (level 2 ) cache 404—data buffers 406 control P-BUS loading by the system DRAM. The system chipset 602 includes P-BUS, DRAM, and L2 cache control.

The datapath chipset 602 interfaces to the conventional X bus. The X bus is an internal 8-bit bus that couples to the BIOS ROM 702 and the RTC (real time clock) 704. In addition, a conventional 8-bit keyboard controller 706 resides on the X-bus.

The system and datapath chipsets 601 and 602 provide interface control for the 16-bit ISA bus and the 32-bit PCI bus. The ISA bus maintains compatibility with industry standard peripherals, coupling to ISA peripheral card slots 710. The PCI bus provides a higher performance peripheral interface for selected peripherals, including coupling to PCI peripheral card slots 810—in particular, a video/graphics card (including VRAM) 802 provides a video/graphics interface, while a storage controller 804 (which may be included as part of the system chipset) interfaces to storage peripherals.

The motherboard 100 couples through the PCI, ISA, and X buses to external peripherals 900, such as keyboard 902, display 904, and mass storage 906. Network and modem interconnections are provided as ISA cards (but could be PCI cards).

1.2. Processor

Referring to FIG. 1a, exemplary Processor 200 is an x86 processor that uses a modular architecture in which pipelined CPU core 202, L1 (level 1) Cache 204, FPU (floating point unit) 206, and Bus Controller 208 are interconnected over an arbitrated C-BUS. The CPU core interfaces to the C-BUS through Prefetch and Load/Store modules. The Bus Controller provides the interface to the external P-Bus.

Referring to FIG. 1b, the Processor uses a six stage instruction execution pipeline: Instruction Fetch IF, Instruction Decode ID, Address Calculation AC1/AC2, Execution EX, and Writeback WB. The superpipelined AC stage performs instruction operand access—register file access, and for memory reference instructions, cache access.

Referring to FIG. 1a, CPU core 202 includes an execution core 210 that encompasses the ID, AC, EX and WB execution stages. A Prefetch Unit 240 performs Instruction Fetch in conjunction with a Branch Unit 250, prefetching instruction bytes for Instruction Decode. A Load/Store unit 260 performs operand loads and stores results for the AC, EX and WB stages. A clock generator 270 receives the external system clock, and generates internal core and other clocks, including performing clock multiplication and implementing clock stopping mechanisms.

Execution core 210 includes a Decode unit (ID) 211, an AC unit 212, and an EX unit 215. A Pipe Control unit 217 controls the flow of instructions through pipe stages of the execution core, including stalls and pipe flushes.

The EX unit is microcode controlled by a microcontrol unit 222 (microsequencer and microrom) and a general register file 224. The EX unit performs add, logical, and shift functions, and includes a hardware multiplier/divider. Operands are transferred from the register file or Cache (memory) over two source buses S0 and S1, and execution results are written back to the register file or the Cache (memory) over a writeback bus WB.

Prefetch unit (FPU) 240 performs Instruction Fetch, fetching instruction bytes directly from the Cache 204, or from external memory through the Bus Controller 208—instruction bytes are transferred in 8 byte blocks to ID 211 for decoding. The FPU fetches prefetch blocks of 16 instruction bytes (cache line) into a three-block prefetch buffer 242. A virtual buffer management scheme is used to allocate physical prefetch buffers organized as a circular queue.

Branch unit (BU) 250 supplies prefetch addresses for COF instructions—predicted-taken branches and unconditional changes of flow (UCOFs) (jumps and call/returns). The BU includes a branch target cache (BTC) 252 for branches and jumps/calls and a return stack RSTK (not shown) for returns—the BTC is accessed with the instruction pointer for the instruction prior to the COF, while the RSTK is controlled by signals from ID 211 when a call/return is decoded. For branches that miss in the BTC and are by default predicted not-taken, the FPU will speculatively prefetch along the not-predicted taken path to enable prefetching to switch immediately in case the branch resolves taken.

The Decode unit (ID) 211 performs Instruction Decode, decoding one x86 instruction per clock. ID receives 8 bytes of instruction data from prefetch buffer 242 each clock, returning a bytes-used signal to allow the prefetch buffer to increment for the next transfer.

Decoded instructions are dispatched to AC 212, which is superpipelined into AC1 and AC2 pipe stages, performing operand access for the EX stage of the execution pipeline. For memory references (reads or writes), the AC1 stage calculates one linear address per clock (address calculations involving three components require an additional clock), with limit checking being performed in AC2—if paging is enabled, the AC2 stage performs linear-to-physical address translation through a TLB (translation lookaside buffer) 230. Instruction operands are accessed during AC2—for non-memory references, the register file is accessed, and for memory references, the Cache 204 is accessed.

The Cache is virtually indexed and physically tagged such that set selection is performed with the linear (untranslated) address available in AC1, and tag comparison is performed with the physical (translated) address available early in AC2, allowing operand accesses that hit in the cache to be supplied by the end of AC2 (the same as a register access). For accesses that miss in the Cache, cache control logic initiates an external bus cycle through the Bus Controller 208 to load the operand.

After operand access, the AC unit issues integer instructions to the EX unit 220, and floating point instructions to the FPU 206. EX and the FPU perform the EX and WB stages of the execution pipeline.

EX 220 receives source operands over the two source buses S0/S1 (a) as immediate data passed along with the instruction from AC 212, (b) from the register file 224, and/or for memory references, (c) from the Cache 204 or external memory through the Load/Store unit. In particular, for memory references that require an external bus cycle, EX will stall until operand load is complete.

Execution results are written back in the WB stage either to the register file, or to the Cache (memory)—stores to the Cache (memory) are posted in store reservation stations in the Load/Store unit 260.

Load/Store (LDST) unit 260 performs load/store operations for the Prefetch unit and the AC/EX units. Four reservation station buffers 262 are used for posting stores—stores can be posted conditionally pending resolution of a branch, retiring only if the branch resolves correctly. Stores are queued in program order—operand loads initiated during AC2 may bypass pending stores.

The L1 (level one) Cache 204 is a 16K byte unified data/instruction cache, organized as 4 way set associative with 256 lines per set and 16 bytes (4 dwords) per cache line. The Cache can be operated in either write-through or write-back mode—to support a write-back coherency protocol, each cache line includes 4 dirty bits (one per dword).

Bus Controller (BC) 208 interfaces to the 32-bit address and data P-BUS, and to two internal buses—the C-BUS and an X-BUS. Alternatively, the BC can be modified to interface to an external 64-bit data P-BUS (such as the Pentium-type bus). The BC includes 8 write buffers for staging external writes cycle.

The C-BUS is an arbitrated bus that interconnects the execution core 210, Prefetch unit 240, LDST unit 260, Cache 204, FPU 206, and the BC 208—C-BUS control is in the BC. The C-BUS includes a 32 bit address bus C_ADDR, two 32-bit data buses C_DATA and C_DDATA, and a 128-bit (16 byte cache line) dedicated instruction bus. C_DATA and C_DDATA can be controlled to provide for 64 bit transfers to the FPU, and to support interfacing the Cache to a 64-bit external data bus. In general, for 32-bit data transfers, the C_DATA bus is used for loads coming from off-chip through the BC to the LDST unit, the Cache, and/or the Prefetch Unit, and the C_DDATA bus is used for stores into the Cache or external memory through the BC. For instruction fetch misses, instruction data is provided over the C_DATA bus to the Prefetch unit at the same time it is provided to the Cache.

The X-bus is an extension of the external bus interface that allows peripheral devices to be integrated on chip.

2. NDIRTY Cache Line Lookahead

Referring to FIG. 2a, the NDIRTY cache line lookahead technique of the invention is implemented as part of the flush/export logic for the L1 cache 204. The L1 cache includes cache logic 301, tag logic 302, and cache control logic 303.

The L1 cache 204 is implemented as a 16K byte unified data/instruction cache arranged as 4 sets of 256 lines per set with 16 bytes per line (4 dwords). Each 16 byte cache line has a 21-bit tag and one valid bit associated with it.

Each 16 byte cache line also includes four dirty bits (one dirty bit per dword) to allow for write-back mode operations (the single valid bit designates the entire line as valid or invalid). The four dirty bits allow for dirty locations to be marked on a dword (32 bit) basis, minimizing the number of external write-back cycles needed during export operations.

For both write-through and write-back modes, the exemplary L1 cache 204 uses a no-write-allocate policy in which cache lines are allocated for read misses but not write misses.

The operating mode of the L1 cache 204 is controlled via bits in three control registers (not shown), the CR0 register and two special cache configuration registers located in the cache control logic 303. In particular, the cache recognizes certain memory regions as noncacheable (such as SMI memory) based on control bit settings in one of the cache control registers.

The cache control logic 303 implements cache management in conjunction with the CR0 and cache control registers, as well as (a) external processor input and output pins (AHOLD, EADS#, FLUSH#, KEN#, A20M#, HITM#, WM_RESET, and INVAL), and (b) certain CPU cache management instructions (INVD, WBINVD). The L1 cache includes three dedicated test registers (not shown) that allow for system level testing of cache integrity.

2.1. Cache Organization

Figure 3A:
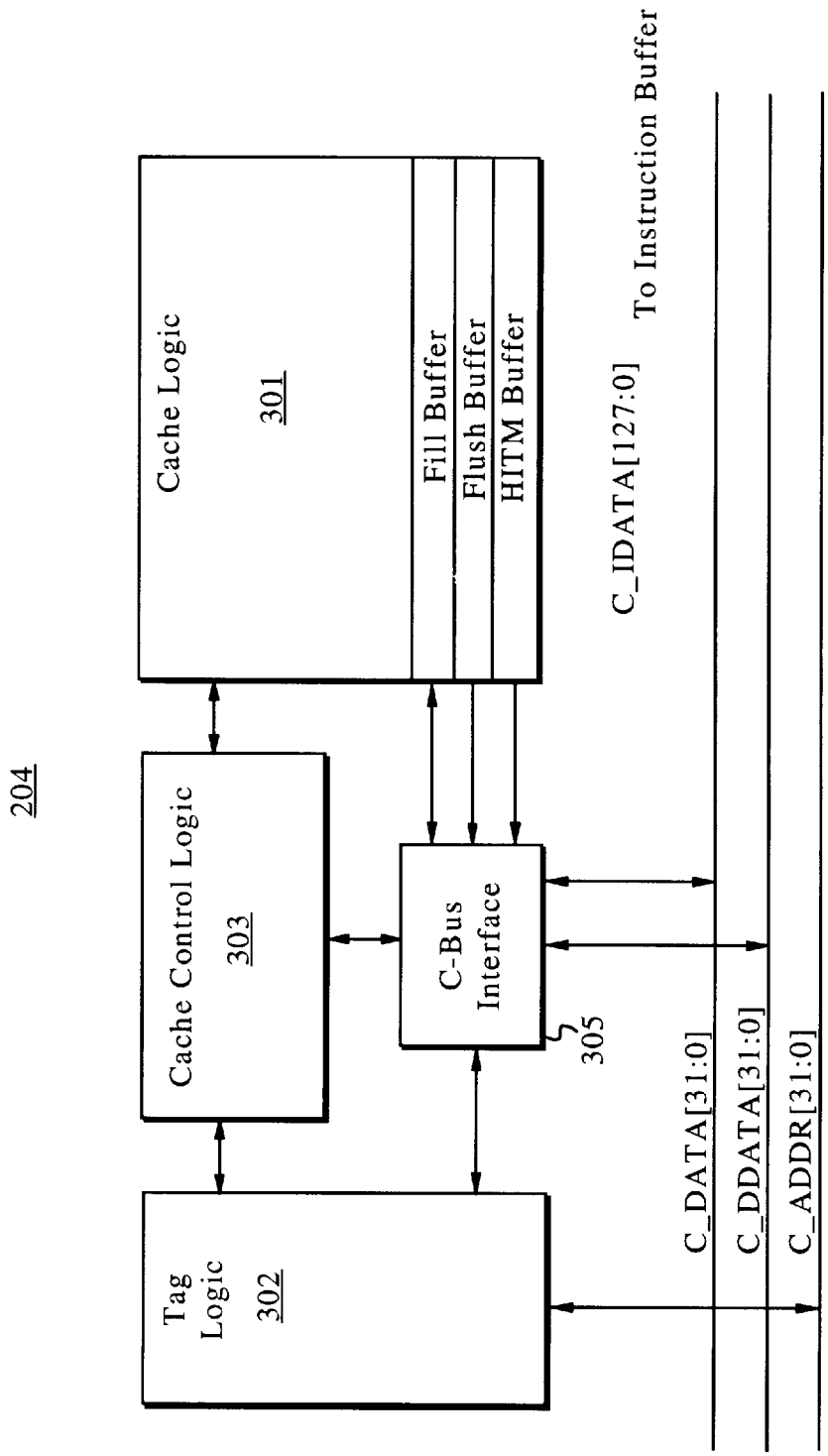
FIGS. 3a and 3b illustrates the exemplary L1 cache organization.
Figure 3B:
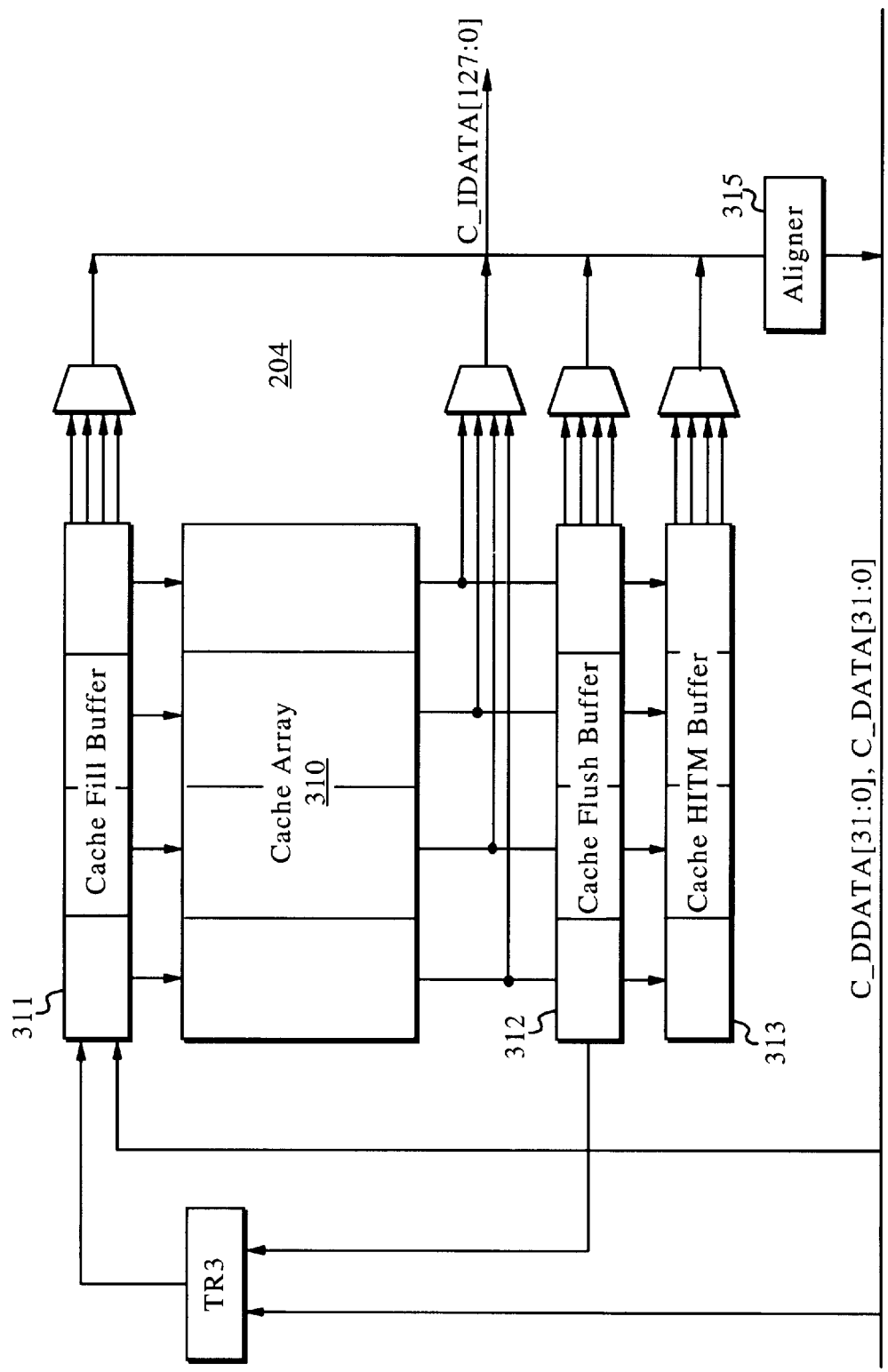

FIGS. 3a and 3b further illustrate the exemplary L1 cache organization, including the cache logic 301 and the tag logic 302. Cache addresses are physical addresses.

Referring to FIG. 2a, the physical cache addresses are sourced over the C_ADDR bus from (a) the prefetch unit 20 for instruction fetches, (b) the AC/TLB 50/55 (via the load/store unit 70) for data accesses, and (c) the C-bus controller 90 for line fills and external cache inquiry cycles. In addition, for cache test operations performed through the test registers, the tag array can both read and write the C_DATA and C_DDATA buses.

Referring to FIG. 3a, cache reads and writes take a single cycle—the cache is read and written in the beginning of PH2 (the last half of the PH1 is used for precharge). Prioritization of cache accesses is governed by the C-bus interface 305.

Figure 4:
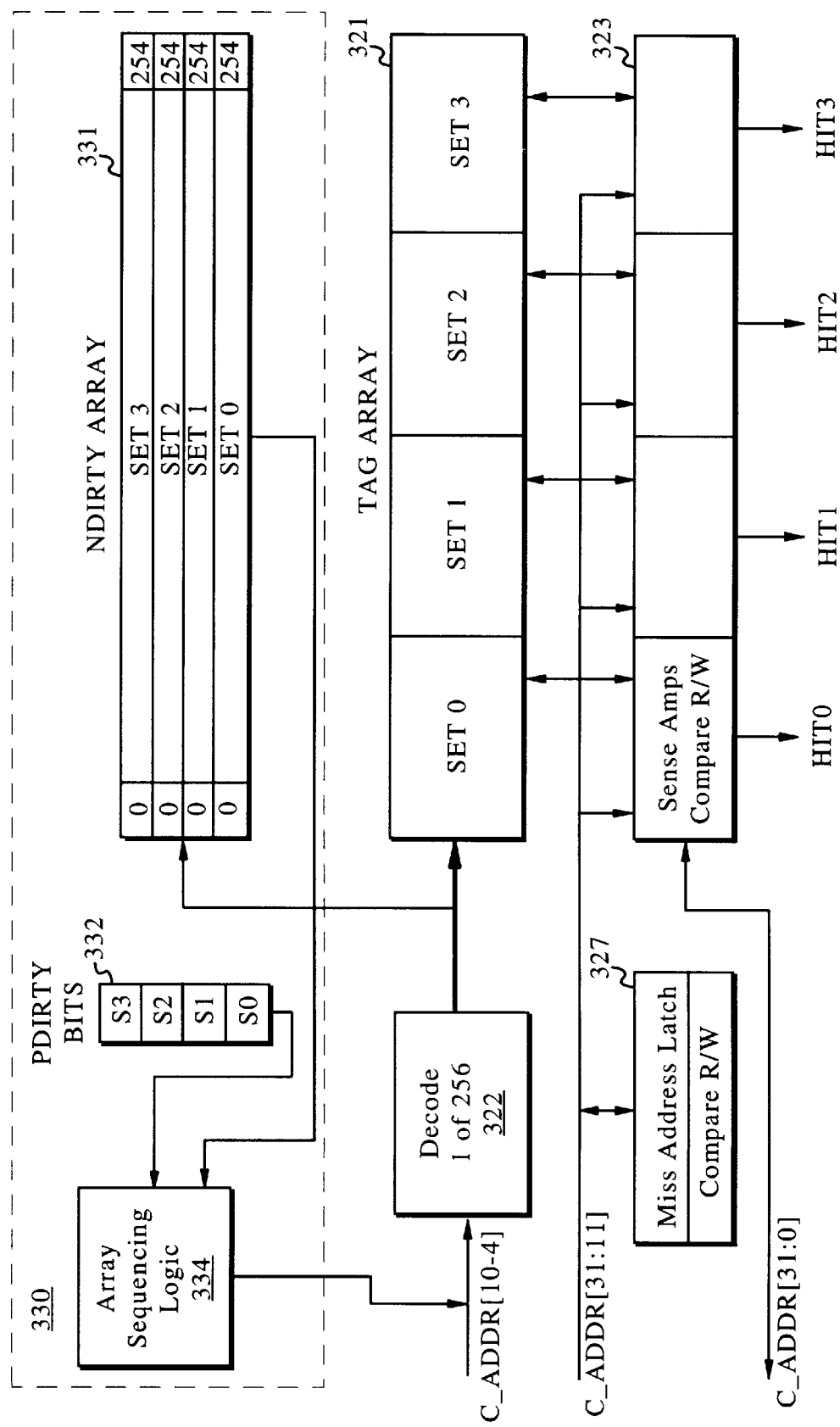
FIG. 4 illustrates the flush/export logic for the L1 cache, including the exemplary implementation of the NDIRTY cache line lookahead technique of the invention as an NDIRTY Array with one NDIRTY bit per cache line for a one-line lookahead (the scanned line and the next line).

FIG. 4 illustrates the tag logic 302 in more detail, including a tag array 321 and tag comparators 323. Like the cache, the tag array 321 is four-way set associative. A cache tag access occurs in two steps: (a) tag array access, and (b) tag comparison.

For tag array access, bits 11–4 of the address off C_ADDR are input to address decode logic 325, which decodes 1 of 256 tag lines—these bits of the cache access address are unaffected by the linear-to-physical address translation, so the tag array can be accessed to read the 4 tags (i.e., the 1 of 256 tag lines in each of the 4 sets of the array 321) can proceed concurrently with the TLB access if the access is from the AC stage.

The result of the tag array access is (a) four physical address tags, (b) four valid bits, and (c) associated tag state information.

For tag address comparison, each address tag from the tag array is input to tag comparators 323. Each of the four tags is then compared to bits 31:12 of the physical address off C_ADDR. If any tag matches, the tag comparison logic 323 asserts a hit signal to indicate that the requested data is resident in the cache.

For load or prefetch accesses in which tag comparison indicates a cache miss, a new entry is allocated in the cache array. The miss address is latched in a miss address latch 327, along with the set to be replaced which is supplied by replacement logic in the cache control logic (303 in FIG. 3a). When the bus controller returns the requested line, the replacement then occurs using the tag and set previously calculated.

Referring to FIG. 3b, accessing cache array 310 is identical to accessing the tag array—cache access address bits 11–4 are decoded to identify 1 of 256 cache lines per set, designating 4 possible cache lines. Hit signals from the tag comparison logic (323 in FIG. 4) then select one of the 4 lines which is either read or written.

The cache array contains a set of 16-byte buffers for controlling data flow—cache fill buffer 311, cache flush buffer 312, and the cache hitm buffer 313. The cache buffers allow an entire line to be read from or written to the cache in a single clock to maximize potential bandwidth to/from the cache.

Cache fill buffer 311 is used to stage incoming data (memory aligned) from the C_DATA bus (and C_DDATA bus for 64-bit transfers). The cache fill buffer assembles an entire 16-byte cache line before initiating the actual cache fill.

The cache flush buffer 312 stages dirty cache data that needs to be exported as a result of (a) a cache flush, (b) a cache inquiry, or (c) replacement. In particular, the cache flush buffer stages export data during a software flush or export operation resulting from the assertion of the FLUSH# pin, or the execution of an INVD or WBINVD instruction—an export operation will be initiated only if a PDIRTY bit is set indicating that a set contains dirty data (see, Section 2.2).

The cache control logic asserts a bus cycle request to the bus controller whenever the cache flush buffer 312 it contains valid data for export—an address latch stores the physical address for the cache line, which is provided to the bus controller. The cache flush buffer is not invalidated until all of the data has been accepted by the bus controller.

For cache line replacements, if the cache line being replaced contains dirty data (dirty bits are checked in the same clock as a read miss is signaled), the line is read into the cache flush buffer in the clock after the fill cycle completes and all four dwords of the replacement line are staged in cache fill buffer 311—in the next clock cycle, the replacement line is written into the cache and an export operation initiated (thereby avoiding coherency issues).

The cache hitm buffer is used to hold a cache line from an external inquiry that results in a cache hit. When an external inquiry address is received via the EADS# input lines, the cache hitm buffer is loaded with the contents of the addressed cache location. The cache hitm buffer is always loaded as a result of an external cache inquiry independent of the current cache operating mode.

If any of the locations (dwords) in the cache line are dirty, the cache control logic will cause the external HITM# signal to be asserted, and request use of the C_DATA and C_DDATA buses to export the dirty data via the bus controller. Specifically, for the exemplary embodiment, if one or two dwords are dirty, two separate non-burst write-back cycles will be run, while if three or four dwords are dirty, a burst write-back cycle of the entire cache line will be run—in the case of a burst write-back cycle, the first dword is placed on C_DDATA, and the remaining three will be transferred to the bus controller over C_DATA.

2.2. Flush/Export Logic

Referring to FIG. 4, the cache control logic (303 in FIG. 3a) includes flush/export logic 330. The flush/export logic implements the NDIRTY cache line lookahead technique of the invention.

In accordance with aspects of the invention, the flush/export logic 330 includes an NDIRTY array 331. The exemplary NDIRTY array is implemented in a one-line lookahead configuration—extension of the NDIRTY cache line lookahead technique to implement N-line lookahead is straightforward (see, Section 2.3).

For cache flush/export operations, the flush/export logic 330 uses the NDIRTY array 331, as well as PDIRTY bits 332, to reduce the number of cycles required to complete the flush or export operation. Conventionally, a flush operation involves scanning each line of the cache to detect those lines that contain dirty data, and either (a) if the line is clean, invalidating the line, or (b) if the line contains dirty data, exporting (writing-back) the dirty data and then invalidating the line export-only operations involve the same scanning and export functions, but without invalidating any cache line.

Array sequencing logic 334 generates scan addresses for scanning the lines of the tag array 321 for dirty data. According to conventional cache flush/export implementations, the scanning logic would sequence the scan addresses to successively scan each line of the tag array—Sets 0–4, 256 lines per set. Typically, a line scan involves reading the line into the tag comparators 323 and checking the dirty bits—at the same time, the corresponding line in the cache array (301 in FIG. 3b) is read into the cache flush buffer (312 in FIG. 3b), and an export operation is performed if the tag comparators detect that the line contains dirty data.

2.2.1. NDIRTY Array

In accordance with aspects of the invention, in generating scan addresses, the scanning logic 334 accesses the NDIRTY array 331 to determine which lines of the cache may be skipped because they do not contain dirty data. In addition, the PDIRTY bits are accessed to determine if an entire set can be skipped because it is entirely clean.

The exemplary NDIRTY array 331 uses the same organization as the tag array 321, with one set of NDIRTY lookahead bits for each set of the tag array. Each NDIRTY set includes an NDIRTY lookahead bit for each cache line of the set except the last line—thus, each NDIRTY set includes 255 [0–254] NDIRTY bits.

FIG. 5a further illustrates the exemplary implementation of a one-line lookahead NDIRTY array. Set 0 of the tag array 321 contains cache lines 0–255, with each line including 4 dwords D0–D4, with a dirty bit per dword—the implementation for Sets 1–3 is identical.

Associated with Set 0 of the tag array 321 is a corresponding set of the NDIRTY array containing NDIRTY lookahead bits 0–254. The NDIRTY bits implement a one-line lookahead function in which the NDIRTY bit for a cache line looks ahead to the next cache line—the last cache line (255) of each set does not require an NDIRTY lookahead bit.

When a cache write access causes data in the accessed line to be modified (dirty bit set), the NDIRTY bit for the immediately preceding line is set to indicate that the accessed line contains dirty data. Thus, the NDIRTY bit 0 associated with cache line 0 indicates whether cache line 1 contains dirty data, and so on with the NDIRTY bit 254 associated with cache line 254 indicating whether the last cache line 255 contains dirty data. Note that cache line 0 has no associated NDIRTY bit—the first cache line of each set is always scanned.

In addition, if any cache line in a set is written, the corresponding PDIRTY bit (332 in FIG. 4) for that Set of the tag array is set, indicating that the set contains at least one dirty line. After a cache flush or export operation is complete, all of the NDIRTY bits are cleared—in the case of either a line replacement or cache inquiry that results in a cache line export, the NDIRTY bit for the preceding cache line is cleared. The PDIRTY bits are cleared after the entire cache is flushed or exported. The NDIRTY and PDIRTY bits are also cleared on a hard reset.

2.2.2. Flush/Expert Operation

Referring to FIGS. 4 and 5a, when a flush/export operation is initiated, the array scanning logic 334 starts scanning with cache line 0 of Set 0—recall that cache line 0 of a set is always scanned. The tag information for cache line 0 is read into the tag comparators 323, and the dirty bits are checked.

At the same time, the NDIRTY array is accessed, starting with NDIRTY bit 0 for NDIRTY Set 0. That is, this NDIRTY bit 0 is read by the scanning logic 334 in the same clock that the tag information for the corresponding cache line 0 is read.

Thus, in parallel with the tag comparators 323 determining whether cache line 0 contains dirty data, the scanning logic 334 looks ahead to the next cache line 1 to determine whether it contains dirty data. If this cache line lookahead operation indicates that the next cache line is clean (NDIRTY bit 0 clear), then the scanning logic increments the scan address count by 2 to skip the next cache line 1, and provides a tag access address for cache line 2 (which may or may not contain dirty data), at the same time reading the NDIRTY bit for that cache line 2.

Referring to FIG. 5a, by way of example, the NDIRTY array indicates that cache line 1 is clean (NDIRTY bit 0 clear), cache line 2 is dirty (NDIRTY bit 1 set), cache line 3 is clean (NDIRTY bit 2 clear), and cache lines 253, 254, and 255 are clean (NDIRTY bits 252, 253, 254 clear). In this example, after scanning cache line 0 (regardless of whether it is dirty), the scanning logic will skip cache line 1 (which is clean), scan cache line 2 (which happens to be dirty), and skip cache line 3 (which is clean). Continuing, the scanning logic will skip cache line 253 (which is clean), read cache line 254 (even though it is clean), and skip cache line 255 (which is clean).

Accordingly, the number of export cycles required for a flush/export operation are reduced, with an attendant increase in system performance.

2.3. Extension To N-Line Lookahead

FIG. 5b illustrates the extension of the NDIRTY cache line lookahead technique to N-line lookahead.

The NDIRTY array 331 includes N NDIRTY arrays for each Set of the tag array 321. In particular, NDIRTY array 331 includes NDIRTY arrays 331a, 331b, 331c.

NDIRTY array 331a corresponds to NDIRTY array 331 in FIG. 4 in that it contains NDIRTY bits 0–254 for cache lines 0–254—this NDIRTY array provides a one-line lookahead respectively to cache lines 1–255. NDIRTY array 331b provides a one-line lookahead to the NDIRTY array 331a corresponding to a two line lookahead to the tag array [2–255]. And NDIRTY array 331c provides a one-line lookahead to the NDIRTY array 331b corresponding to a three-line lookahead to the tag array [3–255].

For a flush/export operation, the scanning logic scans cache line 0, at the same time reading the corresponding NDIRTY bits from NDIRTY arrays 331a, 331b, 331c, etc.

The NDIRTY bits are input to a one-hot adder 340 that detects the next line within the lookahead range, if any, that contains dirty data. The one-hot adder provides a sequence control signal to the array sequencing logic (334 in FIG. 4) to control incrementing the scan address.

For example, for a 3-line lookahead configuration of the NDIRTY array containing NDIRTY arrays 331*a,* 331*b,* and 331*c,* for each scanned line of the tag array 321, the one-hot adder 340 would receive three NDIRTY lookahead bits to determine which, if any, of the next three lines contained dirty data. The output of the one-hot adder would be used by the array sequencing logic to increment the scan count by 1–4 tag line addresses (i.e., if the 3-line lookahead indicates that none of the next three lines contain dirty data, the scanning logic will increment the scan address by four).

3. Conclusion

Although the Detailed Description of the invention has been directed to certain exemplary embodiments, various modifications of these embodiments, as well as alternative embodiments, will be suggested to those skilled in the art.

For example, while the NDIRTY cache line lookahead technique has been described in connection with an L1 cache on a processor, it has general applicability to speeding cache flushes, including L2 caches external to the processor.

Also, specific register structures, mappings, bit assignments, and other implementation details are set forth solely for purposes of providing a detailed description of the invention. And, references to dividing data into bytes, words, double words (dwords), quad words (qwords), etc., when used in the claims, are not intended to be limiting as to the size, but rather, are intended to serve as generic terms for blocks of data.

Moreover, various modifications based on trade-offs between hardware and software logic will be apparent to those skilled in the art.

The invention encompasses any modifications or alternative embodiments that fall within the scope of the claims.

We claim:

1. A cache architecture including cache line lookahead to facilitate cache export, comprising:
   (a) a cache organized into cache lines with one or more data blocks, where each cache line has associated with it at least one dirty indication indicating whether the cache line contains dirty data;
   (b) the cache including cache control logic that, in response to an export command, sequentially scans cache lines and for each cache line, (i) determines whether it contains dirty data, and if it does, (ii) exports such dirty data;
   (c) an N-line lookahead array that includes, for each of at least M of the cache lines, N-line lookahead information that indicates whether any of the N successive cache lines contains dirty data; and
   (d) in response to the export command, when one of the M cache lines is scanned as determined by a current scan count, the N-line lookahead array is contemporaneously accessed to determine whether any of the N successive cache lines contains dirty data; and
   (e) such that, the current scan count is incremented (i) to the next cache line containing dirty data, or if none of the next N successive cache lines contains dirty data, (ii) then by N+1.

2. The cache architecture of claim 1,
   (a) wherein each cache line has associated with it a valid indication indicating whether the cache line is valid; and
   (b) wherein the cache control logic, in response to a flush command, controls the sequence for scanning cache lines to determine, for each cache line, whether it contains dirty data, such that, if it does, such dirty data is exported prior to invalidating the cache line.

3. The cache architecture of claim 1, wherein N=1, such that, for each of the M cache lines, the N-line lookahead array includes an indication of whether the next successive cache line contains dirty data.

4. The cache architecture of claim 1, wherein each cache line includes multiple dwords each of which has associated with it a dirty indication, and wherein the N-line lookahead array includes an indication of whether, for any of the N successive cache lines, any of the dwords in those cache lines contains dirty data.

5. The cache architecture of claim 1, wherein the cache architecture is implemented for the internal cache of a processor.

6. A cache architecture including cache line lookahead to facilitate cache export, comprising:
   (a) a cache organized into cache lines with one or more data blocks, where each cache line has associated with it at least one dirty indication indicating whether the cache line contains dirty data;
   (b) N-line lookahead means for indicating, for each of at least M of the cache lines, whether any of the N successive cache lines contains dirty data; and
   (b) array sequencing means for controlling, in response to an export command, the sequence for scanning cache lines to determine, for each cache line, whether it contains dirty data, such that, if it does, such dirty data is exported;
   (d) in response to the export command, when the array sequencing means scans one of the M cache lines as determined by a current scan count, it contemporaneously accesses the N-line lookahead means to determine for such cache line whether any of the N successive cache lines contains dirty data; and
   (e) in response to accessing the N-line lookahead array, the array sequencing means increments the current scan count to the next cache line containing dirty data, or if none of the next N successive cache lines contains dirty data, then the array sequencing means increments the current scan count by N+1.

7. The cache architecture of claim 6,
   (a) wherein each cache line has associated with it a valid indication indicating whether the cache line is valid; and
   (b) wherein the array sequencing means, in response to an flush command, controls the sequence for scanning cache lines to determine, for each cache line, whether it contains dirty data, such that, if it does, such dirty data is exported prior to invalidating the cache line.

8. The cache architecture of claim 6, wherein N=1, such that, for each of the M cache lines, the N-line lookahead array includes an indication of whether the next successive cache line contains dirty data.

9. The cache architecture of claim 6, wherein each cache line includes multiple dwords each of which has associated with it a dirty indication, and wherein the N-line lookahead means indicates whether, for any of the N successive cache lines, any of the dwords in those cache lines contains dirty data.

10. The cache architecture of claim 6, wherein the cache architecture is implemented for the internal cache of a processor.

11. A cache line lookahead method for facilitating cache export in a cache organized into cache lines with one or more data blocks, where each cache line has associated with it at least one dirty indication indicating whether the cache line contains dirty data, comprising the steps:

(a) indicating, for each of at least M of the cache lines, whether any of the N successive cache lines contains dirty data;

(b) in response to an export command, scanning cache lines to determine, for each cache line, whether it contains dirty data, and if it does, exporting such dirty data;

(c) when one of the M cache lines is scanned as determined by a current scan count, contemporaneously determining for such cache line whether any of the N successive cache lines contains dirty data; and (e) incrementing the current scan count to the next cache line containing dirty data, or if none of the next N successive cache lines contains dirty data, then incrementing the current scan count by N+1.

12. The cache line lookahead method of claim 11, wherein each cache line has associated with it a valid indication indicating whether the cache line is valid, further comprising the step:

(a) in response to a flush command, scanning cache lines to determine, for each cache line, whether it contains dirty data, and if it does, exporting such dirty data prior to invalidating the cache line.

13. The cache line lookahead method of claim 11, wherein N=1.

14. The cache line lookahead method of claim 11, wherein the cache is an internal cache of a processor.

15. A computer system including a processor and a cache including cache line lookahead to facilitate cache export, comprising:

(a) a system memory for storing data, the computer system using cache export operations to maintain coherency between the system memory and the cache, wherein under selected conditions dirty data is exported from the cache to the system memory;

(b) the cache being organized into cache lines with one or more data blocks, where each cache line has associated with it at least one dirty indication indicating whether the cache line contains dirty data;

(c) N-line lookahead means for indicating, for each of at least M of the cache lines, whether any of the N successive cache lines contains dirty data; and (d) array sequencing means for controlling, in response to an export command, the sequence for scanning cache lines to determine, for each cache line, whether it contains dirty data, such that, if it does, such dirty data is exported;

(e) in response to the export command, when the array sequencing means scans one of the M cache lines as determined by a current scan count, it contemporaneously accesses the N-line lookahead means to determine for such cache line whether any of the N successive cache lines contains dirty data; and (f) in response to accessing the N-line lookahead array, the array sequencing means increments the current scan count to the next cache line containing dirty data, or if none of the next N successive cache lines contains dirty data, then the array sequencing means increments the current scan count by N+1.

16. The cache architecture of claim 15, (a) wherein each cache line has associated with it a valid indication indicating whether the cache line is valid; and (b) wherein the array sequencing means, in response to an flush command, controls the sequence for scanning cache lines to determine, for each cache line, whether it contains dirty data, such that, if it does, such dirty data is exported prior to invalidating the cache line.

17. The cache architecture of claim 15, wherein N=1, such that, for each of the M cache lines, the N-line lookahead array includes an indication of whether the next successive cache line contains dirty data.

18. The cache architecture of claim 15, wherein each cache line includes multiple dwords each of which has associated with it a dirty indication, and wherein the N-line lookahead means indicates whether, for any of the N successive cache lines, any of the dwords in those cache lines contains dirty data.

19. The cache architecture of claim 15, wherein the cache is implemented as the internal cache of the processor.

20. A method of cache line lookahead to facilitate cache export operations in a computer system that includes a processor and a cache organized into cache lines with one or more data blocks, where each cache line has associated with it at least one dirty indication indicating whether the cache line contains dirty data, comprising the steps:

(a) maintaining coherency between the cache and a system memory by exporting, under selected conditions, dirty data from the cache to the system memory;

(b) indicating, for each of at least M of the cache lines, whether any of the N successive cache lines contains dirty data;

(b) in response to an export command, scanning cache lines to determine, for each cache line, whether it contains dirty data, and if it does, exporting such dirty data;

(c) when one of the M cache lines is scanned as determined by a current scan count, contemporaneously determining for such cache line whether any of the N successive cache lines contains dirty data; and (e) incrementing the current scan count to the next cache line containing dirty data, or if none of the next N successive cache lines contains dirty data, then incrementing the current scan count by N+1.

21. The cache line lookahead method of claim 20, wherein each cache line has associated with it a valid indication indicating whether the cache line is valid, further comprising the step:

(a) in response to a flush command, scanning cache lines to determine, for each cache line, whether it contains dirty data, and if it does, exporting such dirty data prior to invalidating the cache line.

22. The cache line lookahead method of claim 20, wherein N=1.

23. The cache line lookahead method of claim 20, wherein the cache is an internal cache of the processor.

* * * * *